US006833683B2

(12) United States Patent
Winkler

(10) Patent No.: US 6,833,683 B2
(45) Date of Patent: Dec. 21, 2004

(54) UNIVERSAL BATTERY CHARGER APPARATUS

(76) Inventor: Harry L. Winkler, P.O. Box 632, Pinehurst, ID (US) 83850

( * ) Notice: Subject to any disclaimer, the term of this patent is extended or adjusted under 35 U.S.C. 154(b) by 57 days.

(21) Appl. No.: 10/407,752

(22) Filed: Apr. 7, 2003

(65) Prior Publication Data

US 2004/0195998 A1 Oct. 7, 2004

(51) Int. Cl.[7] .................................................. H02J 7/00
(52) U.S. Cl. ....................................... 320/109; 320/107
(58) Field of Search ................................ 320/109, 107, 320/110, 115, 121, 123

(56) References Cited

U.S. PATENT DOCUMENTS 6,608,401 B1 * 8/2003 Walter ........................ 307/39

* cited by examiner

Primary Examiner—Lawrence Luk

(57) ABSTRACT

A Universal Battery Charger Apparatus designed to be used with a small gas engine equipped with a small alternator, capable of maintaining the charge level of a small 12 volt battery. Said battery supplies power for the circuit of said battery charger. Said engine drives a second alternator. Said battery charger has a wide range of controlled output voltages as well as 12 different current limiting capabilities making possible use of not only a battery charger for charging different voltages of external batteries, but also a DC arc welder and/or a 115 volt DC, power supply, all within its own framework, thus making said apparatus portable.

11 Claims, 2 Drawing Sheets

UNIVERSAL BATTERY CHARGER APPARATUS

CROSS REFERENCE TO RELATED APPLICATIONS

The invention herein is related to my own vehicular battery charger U.S. Pat. No. 4,449,089 issued May 15, 1984 to Winkler, as well as to my own vehicular arc welder U.S. Pat. No. 4,705,934 issued Nov. 10, 1987 to Winkler. This present invention can take the place of my own prior art battery charger U.S. Pat. No. 4,449,089 and can be used with my arc welder prior art U.S. Pat. No. 4,705,934.

BACKGROUND OF THE INVENTION

1. Field of the Invention

This invention relates generally to a universal battery charger apparatus.

A. Provides a wide range of current limiting abilities.

B. Capable of charging a wide range of different voltage batteries.

C. Provides a 115 volt DC power supply.

D. Provides a DC arc welding system.

2. Description of Prior Art

In general there are a good number of different battery chargers that use part of a vehicle's electrical system and add a switching system that pulls away from maintaining that vehicle's battery system, using said vehicle's alternator to charge external batteries and/or for arc welding. One such battery charger is in U.S. Pat. No. 4,449,089 issued May 15, 1984 to Winkler. In said patent, I used a potentiometer to get the different controlled output voltage levels for charging batteries. The problems with using a potentiometer is after it was used for awhile, said potentiometer would have blank spots and would break contact, causing the output voltage to go wild. Life of said potentiometer was on the short side. Also, I found said potentiometer was on the inconvenient side for adjusting for different output voltages. There are a good number of 115 volt AC and/or 230 volt AC generators on the market. I am not referring to the large ones, as their engines go as low as 2.5 HP and up. They are self-contained and portable. In general they produce AC power with quite limiting 12 volt battery charging abilities. There are a number of DC arc welders with a 115 volt power supply on the market, but, as far as I know they are not designed for charging external batteries. They are self-contained and portable, but they are big, bulky and heavy. There are also some battery powered arc welders, one such arc welder is in U.S. Pat. No. 5,250,786 issued Oct. 5, 1993 to Kiknchi, Tanuma and Suzuki of Japan. Said patent appears to have no battery charging ability other than its own 36 volt battery system.

SUMMARY OF THE INVENTION

For the summary of the invention see the Block Diagram in FIG. 1. It is an object of this invention to provide a universal battery charger apparatus, powered by a small gas engine in the range of 5 HP low and up to 10 HP high. Said engine to be equipped with a small 12 volt alternator with at least a 4 AMP output rating. Said alternator to be used with a regulator to maintain a small 12 volt battery, as well as supplying voltage to the input of the circuit of said battery charger. A standard vehicle's alternator is used, its field is powered and controlled by the circuit of said battery charger.

It is another object of this invention to provide a battery charger capable of producing a wide range of different controlled voltages for charging batteries.

It is still another object of this invention to provide a wide range of current limiting abilities independent of the voltage sensor.

It is another object of this invention to provide a battery charger capable of light duty arc welding, as well as combining its output energy at the workload in arc welding with a battery powered arc welder, as in prior art U.S. Pat. No. 4,705,934 issued Nov. 10, 1987 to Winkler, when said battery powered arc welder has no arc, its 36 volt battery system automatically recharges from said battery charger.

It is still another object of this invention to provide a 115 volt DC power supply, with no fuse nor circuit breaker needed in the output.

It is another object of this invention to provide a cold weather starting aid for motors with a 12 or 24 volt battery system; 1. by keeping the batteries charged; 2. When the starter of said motor engages, the battery charger will produce full output power up to the current limit setting, thus boosting the starting ability of the equipment or vehicle's motor; 3. Also, said charger can power block heaters.

It is a further object of this invention is to get away from the problems in prior art, for example, a battery charger, an arc welder, and/or a DC power supply being installed in a vehicle and in some cases, a second alternator is also installed, thus making their system portable. When said vehicle is tied up with repair work being done, or far worse yet, people trade off said vehicle. Keep in mind older vehicles had reasonable room under their hood and elsewhere for installing different equipment. As years have gone by, less space is left available for installing any added equipment in newer vehicles.

My invention solves the above problems in prior art by keeping the apparatus self-contained, light weight and portable. Battery powered arc welders can also be self-contained and portable.

DESCRIPTION OF THE PREFERRED EMBODIMENT

Figure 2:
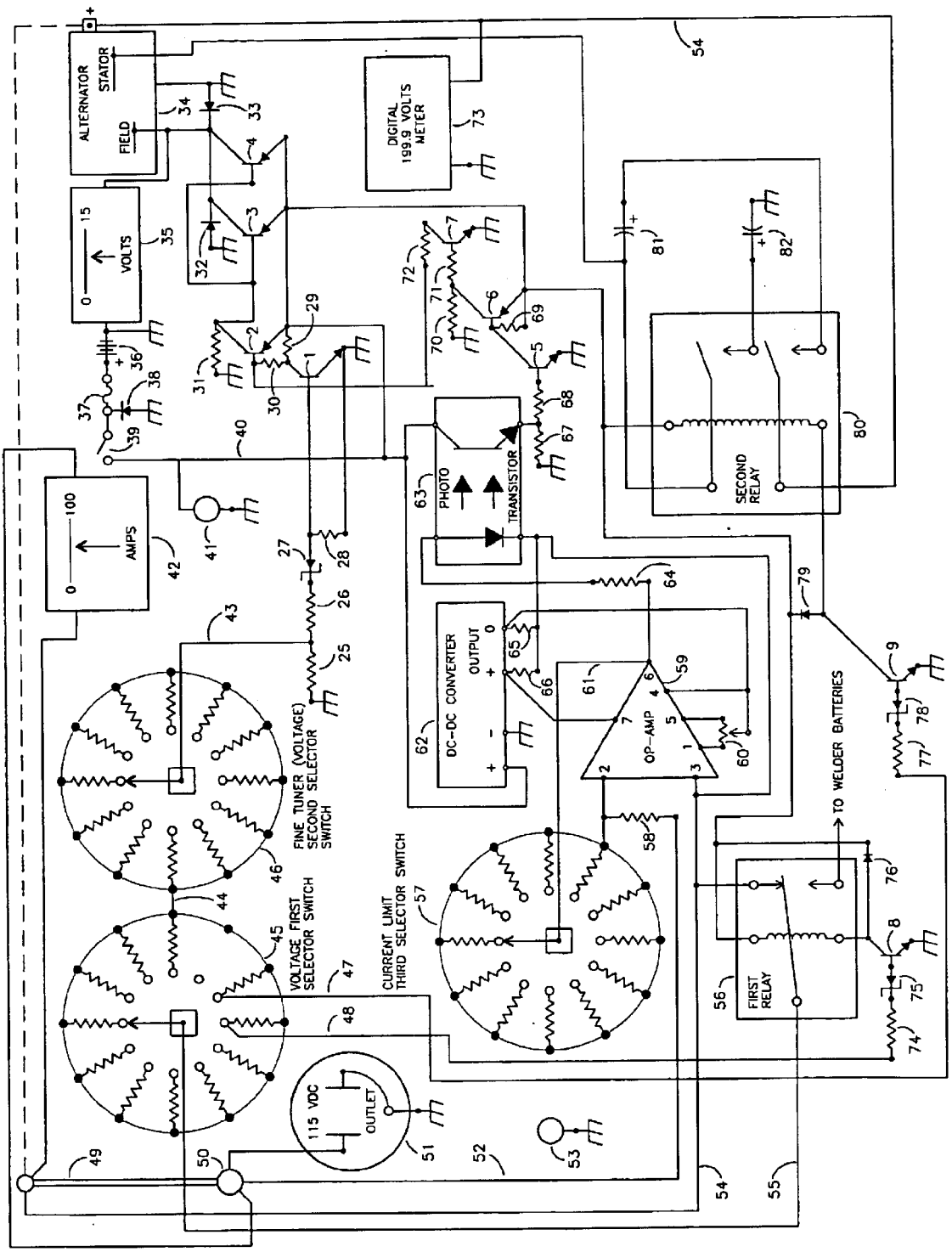
FIG. 2 shows the circuit used in the universal battery charger apparatus. In said circuit, the lines - - - - - connects the Heavy Lead #49 to the Output+Terminal of the alternator.

An explanation of the universal battery charger's circuit is based with a 12 volt battery #36 installed, with the 12 volt+power switch #39 turned ON. A diode #38 is wired across one end of a fuse #37 and to the ground. Said diode is poled to blow said fuse in the event of reverse polarity. As seen in FIG. 2, transistors #2,3,4 and 6 are PNP type, with their emitters connected to the 12 volt+lead #40. Transistors #1,5,7,8 and 9 are NPN type, with their emitters connected to ground. As seen in FIG. 2, the collectors of both power transistors are connected to the field terminal of the alternator #34. Said output power transistors #3 and #4 are a matched pair and are wired to produce full output voltage to said field of said alternator #34 until said transistors receive a different command from either the voltage sensor or the current limiter. A resistor #31 with one end connected to ground, the other end connected to the bases of said power transistors #3 and #4, thus making a negative bias for said power transistors. Two diodes #32 and #33 with anode ends connected to ground and cathodes connected to the collector's of said power transistors #3 and #4. Said diodes are used to protect said power transistors from inductive spikes caused by the field windings of said alternator #34.

A voltage divider network is used to control said alternator's output voltage and I feel the way the voltage is divided in said voltage divider network it needs no explanation to a person skilled in the field. A resistor #25 is connected across the output of said voltage divider network and to ground, Lead #43 is connected from said voltage divider network output in series with a resistor #26, a zener diode #27, with anode connected to the base of transistor #1 and to ground. A resistor #30 is connected from the collector of said transistor #1 to the base of a regulator transistor #2. A resistor #29 is connected from said collector of said transistor #1 to the emitter of said transistor #2.

Going back to the voltage divider network, when the output voltage rises to a significant voltage level, said Zener diode #27 will break down, passing the voltage on to the base of said transistor #1. When a significant voltage level is reached, said Transistor #1 will switch on, thus creating a negative bias at the base of said regulator transistor #2 and when a significant voltage level is reached, said transistor #2 will switch ON, thus creating a positive voltage at the bases of the power transistors #3 and #4. When a significant voltage level is reached said power transistors will switch OFF, thus cutting off the alternator's #34 field voltage. By using said voltage divider network and a Zener diode, the universal battery charger's circuit works to maintain the voltage level that said selector switches are set for, by switching the output voltage OFF and On. With this switching action, the two output power transistors #3 and #4 operate more cool because they are more fully ON and OFF. Also, their total power producing ability is increased. By using said two PNP type (matched pair) power transistors, the output voltage to said field of said alternator will be very close to the supply voltage when working at maximum power.

Again, going back to the voltage divider network, a 12-position rotary switch #45 shorting type is used as a selector switch for different voltages. For example, 6, 12, 18, 24, 30, 32, 36, 36, 42 and 48 volts, all with a 0.4 volt per cell built-in charge level for battery charging. Also, said voltage selector switch #45 has one setting for a 115 volt DC power supply. Eleven resistors are wired across eleven of the terminals of said switch #45, leaving one said switch terminal blank allowing for a twelfth resistor to be added at a later date for a special voltage. In the meantime, when said selector switch #45 is in the twelfth position, said alternator will operate on (uncontrolled) full output voltage without said twelfth resistor.

A 12-position rotary switch #46 shorting type is used as a selector switch for a fine tuner for subtracting from the output voltage up to 2.5 volts, or adding to the output voltage up to 3 volts in ½ volt jumps. Twelve resistors are wired across the terminals of said fine tuner switch #46 in said voltage divider network.

As seen in FIG. 2, a jumper wire #44 connects said eleven resistors to said twelve resistors in said voltage divider network. I feel the voltage divider network needs no explanation on the resistors values in ohms.

As seen in FIG. 2, a 12-position rotary switch #57 shorting type is used as a selector switch for current limiting controls, for example, 10, 15, 20, 30, 40, 50, 60, 70, 75, 80, 90 and 100 amps. Twelve resistors are wired across the terminals of said selector switch #57. Said resistors work as a multiplier, for example, if the alternator's output heavy lead #49 has 10 amps current going through it and a voltage drop of 5 millivolts, said 5 millivolts (if multiplied by 250) the output would be 1.25 volts. Another example, if said alternator's output heavy lead #49 has 50 amps current going through it, the voltage drop would be 25 millivolts (if multiplied by 50) the output would be 1.25 volts, assuming the current limit control point is 1.25 volts.

An explanation how the current limit works, said alternator's output heavy lead #49 (having a small voltage drop within it) which has both a positive and a negative voltage. Said negative voltage is connected to a lead #52 and on through a resistor #58 to terminal 2 of said op-amp #59. Said positive voltage goes to terminal 3 of said op-amp #59.

As seen in FIG. 2, said op-amp is powered by the output of a 12 volt DC-DC isolated converter #62. The 12 volt+ output terminal of said converter #62 is connected to terminal 7 of said op-amp #59. The 0-volt output terminal of said converter #62) is connected to terminal 4 of said op-amp #59. Also, terminal 4 of said op-amp #59 is connected to the center terminal of a potentiometer #60. One end of said potentiometer #60 is connected to terminal 1 of said op-amp #59, the opposite end of said potentiometer #60 is connected to terminal 5 of said op-amp #59. Said potentiometer is used to adjust the output of terminal 6 of said op-amp to zero volts at the time the unit is produced. A resistor #64 is connected in series from terminal 6 of said op-amp #59 to anode terminal of the input of a photo transistor #63. Two resistors #65 and #66 are connected in series across the output terminals of said converter #62, thus making a split-voltage supply. The output+terminal of said alternator #34 is connected to lead #54.

Also, said lead #54 is connected to terminal 3 of said op-amp #59, said lead #54 is connected in between said two resistors #65 and #66, said lead #54 is connected to cathode terminal of the input of said photo transistor #63. One end of a heavy lead #49 is connected to the output+terminal of said alternator #34, the other end of said heavy lead #49 is connected to a taper lock jack #50. Note, the heavy lead #49 is designed to drop 50 millivolts with a 100-amp load on said lead #49.

A shunt type DC amp-meter can be wired across said lead #49, thus cutting costs by eliminating the need for a 50 millivolt shunt. A second taper lock jack #53 is connected to ground. The output of terminal 6 of said op-amp #59 has a feedback line #61 that the energy goes through one of the 12 current limit resistors and on to terminal 2 of said op-amp #59, thus making available 12 different current limit settings on the current limit selector switch #57. One end of said 12 resistors are wired together on said selector switch #57 and connected to terminal 2 of said op-amp #59. The other end of said 12 resistors on said selector switch selects one resistor at a time for 12 different current levels. As seen in FIG. 2, all current limiting controls up to and including the input terminals of said photo transistor #63 are isolated from the battery charger circuit's ground. From the output of said photo transistor #63 everything goes back to the battery charger circuit's ground. A resistor #70 is connected from the collector of transistor #6 and to the ground. A resistor #69 is connected from the base of said transistor #6 and to the emitter of said transistor #6. A resistor #67 connects across the emitter of said photo transistor #63 and to the ground. When the input of said photo transistor #63 receives a significant voltage from said current limiter, said photo transistor will switch ON passing the energy on through a resistor #68 and to the base of transistor #5. When a significant voltage level is reached said transistor #5 will switch ON, thus creating a negative voltage at the base of said transistor #6, when a significant voltage level is reached said transistor #6 will switch ON, thus creating a positive voltage which is passed on through a resistor #71, in series to the base of transistor #7, when a significant voltage level is reached said transistor #7 will switch ON, thus creating a negative voltage that is passed on through a resistor #72, in series to the base of said regulator transistor #2, when a significant voltage level is reached said transistor #2 will switch ON, thus creating a positive voltage at the bases of said power transistors #3 and #4, when a significant voltage level is reached said power transistors will switch OFF, thus cutting off the field voltage of said alternator #34. Said current limiter works not to exceed the current limit that said selector switch #57 is set for by the continuous OFF/ON switching action in the circuit of the universal battery charger.

As seen in FIG. 2, said regulator transistor #2 is controlled by either the voltage sensor or the current limiter. Thus, in a sense said current limiter operates independently of the voltage sensor. For example, if you were using the 115 volt DC power supply, the current limit is set at 15 amps and you put a 20 amp load on said power supply, said battery charger's circuit would cut down the alternator's output volts to the point where 15 amps is consumed. Thus, neither a circuit breaker nor a fuse is needed in said charger's output. Also, on said power supply, you can dead short the alternator's output and the field voltage drops down to 2.2 volts on the 10 amp setting, or 2.7 volts on the 15 amp setting.

Going back to the voltage selector switch #45, a voltage sensor lead #55 is connected to the input of said voltage selector switch #45, to the center terminal of the first relay #56. As seen in FIG. 2, when said selector switch #45 is set for (Batt. 36v. Weld), voltage from said selector switch #45 is to lead #48, in series through a resistor #74, a Zener diode #75, to the base of transistor #8 NPN. The collector of said transistor #8 is connected to one end of a first relay's #56 coil, the other end of said coil is connected to the 12 volt+lead #40, thus switching said first relay ON, thus changing the voltage sensor from said alternator's #34 output+terminal over to the +terminal of a 36 volt battery system of a battery powered arc welder. Said selector switch setting (Batt. 36V. weld) is used in some battery powered arc welders, however, other battery powered arc welders would use the regular 24 or 36 volt setting on said voltage selector switch. I am not claiming a battery powered arc welder, nor an improvement to a battery powered arc welder, so none is shown in the drawings.

I am claiming a universal battery charger apparatus that can be used with some of the battery powered arc welders. Two single conductor taper lock jacks are used for taking the energy from the output of the universal battery charger's alternator 434, for either battery charging and/or arc welding. Said first taper lock #50 is connected to the far end of the heavy lead #49 from said alternator's #34 output+ terminal. Said second taper lock jack #53 is connected to ground. Two taper lock jacks means for transferring electrical energy from said first and said second taper lock jacks #50 and #53 to the workload in arc welding. Means electrically connecting in parallel said universal battery charger's arc welder with a battery powered arc welder at said workload in arc welding. Said battery charger's arc welder provides a first portion of energy at said workload in welding and said battery powered arc welder provides a second portion of energy at said workload in welding. Said battery charger provides a charging means for said battery powered arc welder's batteries during time when an arc is not generated. Also, said battery charger;s arc welder can be used direct for light duty arc welding by selecting the desired voltage and current.

As seen in FIG. 2, when the voltage selector switch #45 is set for (115 V. DC power), voltage from said selector switch #45 is connected to lead #47 in series through a resistor #77, a Zener diode #78, to the base of transistor #9 NPN. The collector of said transistor #9 is connected to one end of the second relay's #80 coil, the other end of said coil is connected to the 12 volt+lead #40, thus switching said second relay #80 ON. Said second relay is used for coupling two electrolytic capacitors to the alternator for doubling the output voltage, as well as filtering the output voltage.

As seen in FIG. 2, the positive end of the first capacitor #81 is connected in series through a first set of points of said second relay #80, onto the output+terminal of said alternator #34. The positive end of the second capacitor #82 is connected in series through a second set of points of said second relay #80, onto the negative end of said first capacitor #81 and onto the stator terminal of said alternator #34. The negative end of said second capacitor #82 is connected to ground. A receptacle #51 has three terminals. The positive terminal is connected to said first taper lock jack #50, the remaining two negative terminals are connected to ground. Said receptacle is used for taking the 115 volt DC power from the universal battery charger.

A pilot light #41 is connected to the OFF/ON switch #39 and ground. A 15 volt-meter #35 is connected to the field terminal of said alternator #34 and to ground. A 0–199.9 digital volt-meter #73 is connected to the output+terminal of said alternator #34 and to ground. A 0–100 amp-meter #42 is connected from the output+terminal of said alternator #34 to first taper lock jack #50.

Said pilot light, said 15 volt-meter, said 0–199.9 digital volt-meter and said 0–100 amp-meter are used as a guide for the operator. It will be understood that said amp-meter may go to a higher amp rating. Also, the 100 amp alternator may go to a higher output rating. Note, the two zener diodes #75 and #78 are used to prevent the first and second relay from switching until a higher voltage is selected. Both diodes #76 and #79 are connected, one each across said first and second relay's coils, protecting the two switching transistors #8 and #9 from the inductive spikes. A resistor #28 is connected between said base of transistor #1 and ground. Said 12 volt+lead #40 connects to the input+terminal of said converter #62. The input negative terminal of said converter #62 is connected to ground. Said 12 volt+lead #40 connects to the collector of said photo transistor #63.

Figure 1:
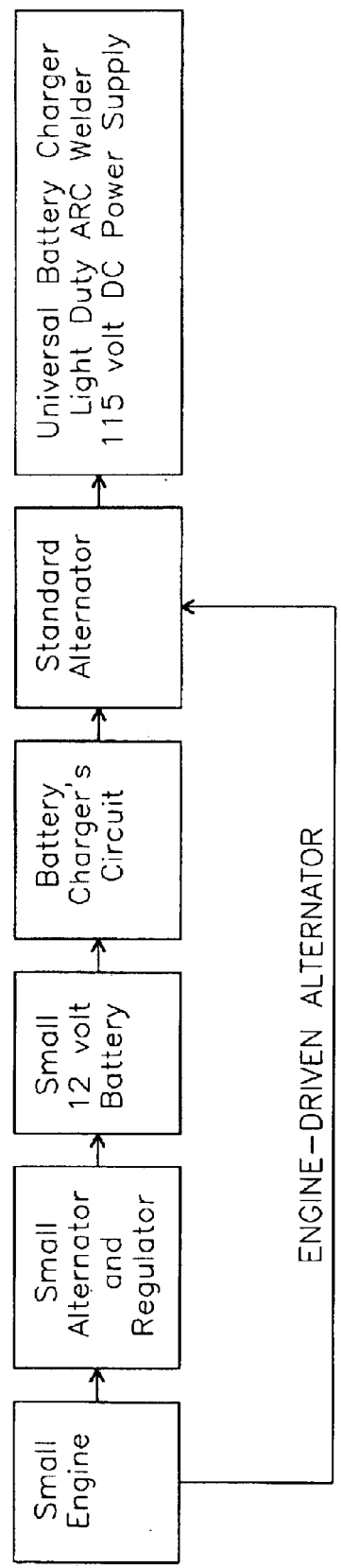
FIG. 1 shows a Block Diagram of the method used in the universal battery charger apparatus.

I've built a test model of the universal battery charger apparatus using the same system as seen in FIG. 1, as well as said charger's circuit, as seen in FIG. 2. I used a Honda 5.5 gas engine with a built-in 100 watt 12 volt alternator. An individual regulator and rectifier system are used for controlling said alternator's output volts. I used a sealed lead-acid 12 volt battery, 5 lb. weight.

I used a large case alternator for Ford, a 90 amp, as well as a 100 amp alternator. Both work good. In order to produce the 115 volt DC power supply, I had to add a voltage doubler to the alternator. Also, I had to increase said alternator's RPM to 4500 to produce the 15 amp's current for said power supply. Said Honda engine runs at 36 RPM, full throttle (standard). I increased the drive ratio by 25% to get the 4500 RPM.

Tests have shown it is very important to have a good current limiter to prevent overloading a small engine. A 5.5 HP engine driving an alternator will produce 1700 to 1800 watts without overloading said engine. Naturally, as the engine's horse-power is increased, so is the watts rating. When working within any given voltage range, you can calculate where to set the current limit to avoid overloading said engine.

Various changes may be made in the details of construction without departing from the spirit and scope of my invention as defined by the appended claims.

I claim:

1. A universal battery charger apparatus comprising:

an engine including a first alternator means for generating an A-C voltage, said alternator also including a means for converting said A-C voltage into D-C voltage, said alternator also including a means for transferring electrical energy from said first alternator for a charging means for charging a 12 volt battery, a said 12 volt battery means for transferring electrical energy from said 12 volt battery to the input of the circuit of said battery charger apparatus;

a second alternator means including a field terminal, stator terminal, output+terminal and ground terminal, also said second alternator means for generating an A-C voltage, said second alternator also including a means for converting said A-C voltage into D-C voltage, a said engine means for driving said second alternator from said-engine, a portable means for said battery charger apparatus to be self-contained within its own framework;

a voltage divider network means includes 25 resistors connected to said voltage divider network, includes means connecting a first 12-position rotary switch for selecting different voltage, includes means connecting a second 12-position rotary switch as a fine tuner for said voltage, a voltage sensor means for transferring electrical energy from said alternator's output+terminal to input of said voltage divider network;

a first taper lock jack means, a second taper lock jack is connected to ground, dual power transistors means includes transferring electrical energy from said power transistor's output to said second alternator's field terminal;

a first solid state switching system means includes a zener diode when said diode receives a significant voltage level from said voltage divider network's output said diode will break down passing voltage on to base of a first transistor when said base receives a significant voltage level said first transistor will switch ON thus switching a second regulator transistor ON thus switching a third and fourth power transistors OFF said third and fourth power transistors will immediately switch back ON and the cycle is repeated, said universal battery charger wherein said battery charger has a charging means for charging external batteries.

2. A universal battery charger apparatus as set forth in claim 1 further comprising a current limit control means, a third 12-position rotary switch means includes 12 resistors connected to said switch used as a current selector switch, a heavy lead means includes connecting said lead from said second alternator's output+terminal to said first taper lock jack, a 12 volt isolated DC-DC converter means, a split-voltage supply means, said split-voltage supply means for transferring electrical energy from said supply to input of a photo transistor, also to input of an op-amp and to said second alternator's output+terminal, said converter means for transferring electrical energy from said converter to said op-amp; photo transistor means, an op-amp means;

a second solid state switching system means a 13th resistor is connected in series from said first taper lock jack to terminal 2 of said op-amp, said heavy lead has a small fraction of a volt across it when loaded, naturally it increases as the load increases, transfer means for transferring said fraction of a volt to the inputs of said op-amp, a 14th resistor is connected in series from said op-amp output to input of said photo transistor, said op-amp output has a feedback line to the input of said rotary switch going through one of said 12 resistors and back to input of said op-amp, thus becoming a multiplier for said fraction of a volt, thus increasing said op-amp's output voltage, when said photo transistor receives a significant volt level said photo transistor will switch ON passing the voltage on to the base of a fifth transistor, when said base receives a significant voltage level said fifth transistor will switch ON thus switching a sixth transistor ON thus switching a seventh transistor ON thus switching said second regulator transistor ON thus switching said third and fourth power transistors OFF, said third and fourth power transistors will immediately switch back ON and the cycle is repeated, wherein said battery charger's circuit works not to exceed the current limit that said selector switch is set for.

3. A universal battery charger apparatus as set forth in claim 2 including a means for an arc welder comprising said first taper lock jack means for transferring electrical energy from said second alternator's output+terminal to said first taper lock jack, said second taper lock jack is connected to ground, said first and said second taper lock jacks means for transferring electrical energy from said first and said second taper lock jacks to the workload in arc welding, means electrically connecting said battery charger's arc welder and a battery powered arc welder at said work-load in welding, said battery charger's arc welder provides a first portion of energy at said workload and said battery powered arc welder's supply provides a second portion of energy at said work-load, said battery charger provides a charging means for said battery powered arc welder's batteries during time when an arc is not generated, also said universal battery charger's arc welder can be used direct for light duty arc welding by selecting the voltage and current desired.

4. A universal battery charger apparatus as set forth in claim 2 further comprising means for a 115 volt DC power supply, said power supply includes a receptacle means for transferring electrical energy from said second alternator's output+terminal to said receptacle, said power supply also includes a second relay switching means, when said first selector switch is set for (115 volt DC power) said second relay switches ON, thus coupling two capacitors to said second alternator, a first capacitor means for transferring electrical energy from the positive end of said first capacitor on through a second set of points of said second relay on to said second alternator output+terminal; a second capacitor means for transferring electrical energy from the positive end of said second capacitor on through a first set of points of said second relay on to the negative end of said first capacitor and on to the stator terminal of said second alternator, said second capacitor's negative end is connected to ground, said capacitors double the output no-load voltage plus filters said output voltage.

5. A universal battery charger apparatus as set forth in claim 1 further comprising a DC amp-meter means connected between said second alternator's output+terminal and said first single conductor taper lock jack.

6. A universal battery charger apparatus as set forth in claim 1 further comprising a first relay switching means for said voltage sensor, when said first selector switch is set for (batt/36 v/weld) said first relay will switch said voltage sensor away from said second alternator's output+terminal over to the 36 volt+terminal of a battery powered arc welder.

7. A universal battery charger apparatus as set forth in claim 1 further comprising a 15 volt meter means connected between said second alternator's field terminal and ground, a pilot light means.

8. A universal battery charger apparatus as set forth in claim 1 further comprising a digital voltmeter means connected between said second alternator's output+terminal and ground.

9. A method the battery charger uses for charging external batteries comprising the steps of:
   a. using a small engine equipped with a small alternator and regulator;
   b. said first alternator to maintain a small 12 volt battery;
   c. said battery to power said battery charger's circuit;
   d. said circuit controls a second alternator's field voltage giving a wide range of controlled output voltage by said second alternator which are mostly used for charging different external batteries, also said circuit has a third (current limit) selector switch means for 12 different current settings;
   e. said engine is used to drive said second alternator;
   f. said battery charger is self contained within its own framework thus making said charger portable;
   g. for charging external batteries, set first selector switch to the voltage of the battery (or batteries) to be charged, then set fine-tuner (voltage) second selector switch to the 12 o'clock setting and set said current limit third selector switch to whatever current is desired.

10. The method of claim 9 further including an arc welder using the steps of:
   a. said battery charger has a means to do light duty arc welding at a workload by selecting proper voltage and current desired for said workload;
   b. said battery charger's arc welder can be connected in parallel with a battery powered arc welder at said workload in arc welding thus boosting the power to said workload for medium and/or heavy duty arc welding;
   c. said battery charger provides a charging means for said battery powered arc welder's batteries during time when an arc is not generated.

11. The method of claim 9 further including a 115 volt DC power supply using the steps of:
   a. said battery charger has means to produce 115 volts DC power, step 1 set said first selector switch to (115 volt DC) the second relay will automatically switch ON coupling the two electrolytic capacitors to said second alternator thus doubling the no-load output voltage for said power supply;
   b. said battery charger's circuit has a third (current limit) selector switch means, set said selector for 10 amps or 15 amps for said power supply use, said power supply needs no fuse nor circuit breaker for its operation.

* * * * *